United States Patent [19]

Tedeschi et al.

[11] Patent Number: 4,758,791

[45] Date of Patent: Jul. 19, 1988

[54] UNIVERSAL SECONDARY HIGH VOLTAGE SENSOR

[75] Inventors: Rinaldo R. Tedeschi, Newington; Randal J. Carter, South Windsor, both of Conn.

[73] Assignee: United Technologies Corporation, Hartford, Conn.

[21] Appl. No.: 936,047

[22] Filed: Nov. 28, 1986

[51] Int. Cl.[4] .................................................. G01L 3/26

[52] U.S. Cl. ...................................... 324/402; 324/72; 324/378

[58] Field of Search ............... 324/402, 378, 380, 381, 324/384, 393, 72, 54

[56] References Cited

U.S. PATENT DOCUMENTS 4,052,665 10/1977 Gruenwald ......................... 324/402

4,644,284 2/1987 Friedline ............................... 324/87

FOREIGN PATENT DOCUMENTS 3306431 8/1984 Fed. Rep. of Germany ...... 324/402

*Primary Examiner*—A. D. Pellinen

*Assistant Examiner*—Leon K. Fuller

*Attorney, Agent, or Firm*—Dominic J. Chiantera

[57] ABSTRACT

A universal sensor includes a dielectric substrate, a curved surface capacitive plate mounted to the substrate and responsive to the electromagnetic field (EMF) of an integral coil ignition system, and a rotatable lever arm mounted to the substrate and having wire holders for receiving the EMF of spark plug wires of a distributorless ignition system (DIS)ignition, the arm operable in a closed position to conduct the DIS EMF to the plate, and operable in an open position for securing a standard ignition coil secondary wire between the arm and the plate allowing the standard wire EMF to be coupled to the capacitive plate.

3 Claims, 5 Drawing Sheets

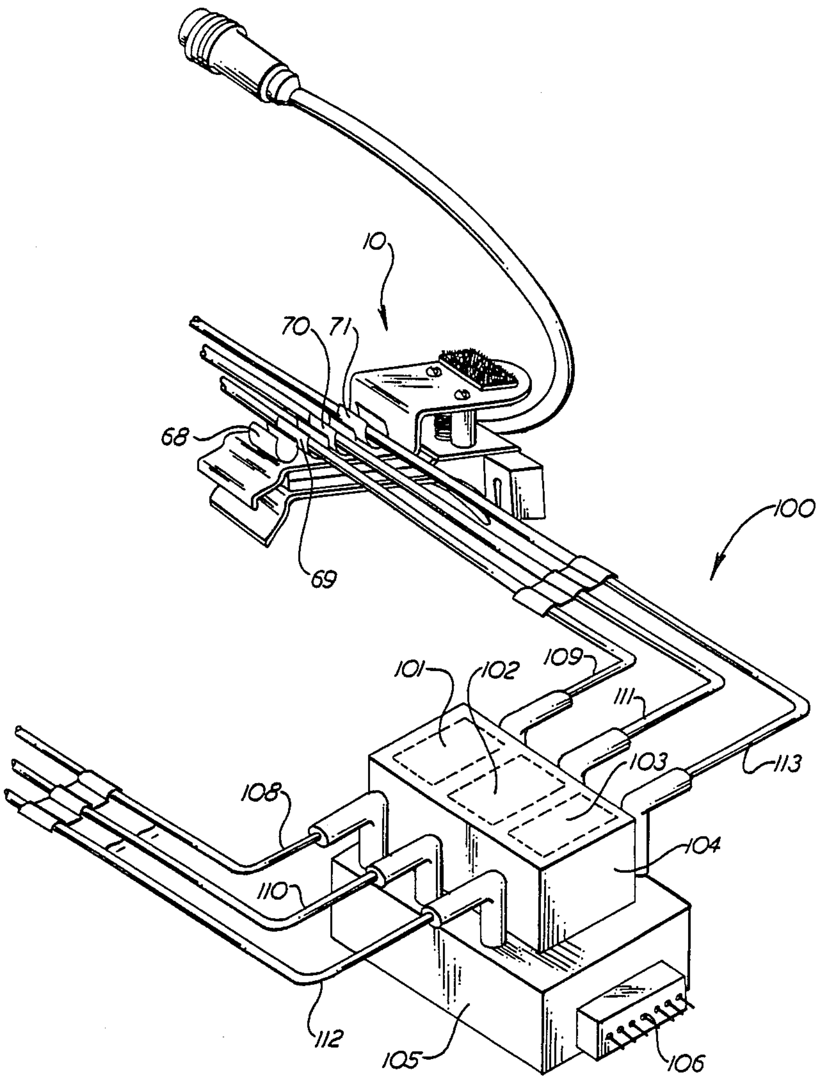
F/G. 8

UNIVERSAL SECONDARY HIGH VOLTAGE SENSOR

DESCRIPTION

1. Technical Field

This invention relates to internal combustion (IC) engine sensors, and more particularly to an IC engine ignition coil secondary voltage sensor.

2. Background Art

In testing internal combustion (IC) engines, one measure of engine performance is the quality of the ignition coil secondary voltage output to the engine spark plugs. Comparison of the individual spark plug firings allows for determination of proper secondary ignition system performance. The secondary voltage is sensed by a sensor pick-up and provided to test equipment circuitry which conditions, measures and displays the sensed voltage signals. Test equipment algorithms may be used to quantify, and make comparisons of the individual plug voltages for diagnostic or performance monitoring. All of which is well known in the art.

A problem currently facing the automotive repair industry, however, is the wide variation in the mechanical/electrical configurations of ignition systems between engine models. These variations fall into three classes: the standard ignition coil with secondary wire connected to the distributor, the integral coil-distributor configuration (e.g. General Motors High Energy Ignition) where the coil is mounted integrally with the distributor cap so as to make the coil wire inaccessible, and the distributorless ignition system ($C^3I$/DIS) configuration which uses no rotor or distributor cap.

Each of these ignition circuit configurations require separate type sensors, sometimes custom made, to measure spark plug voltage. Most of the present automotive test stands require between three and four such sensor probes to accomplish this task. The high number of probes and the frequency of change between the models being serviced results in the loss or misplacing of the probes, and also the mechanic's loss of time in switching from one probe to another.

DISCLOSURE OF INVENTION

The object of the present invention is to provide a universal sensor for providing a sensed indication of the maginitude of the voltage signals presented to the spark plugs of internal combustion (IC) engines having a plurality of different type ignition systems.

According to the present invention, a universal sensor includes a dielectric substrate with electrical signal connector, a curved surface capacitive plate mounted to one side of the substrate in electrical contact with the connector and responsive to the electromagnetic field (EMF) of an integral coil ignition system, and a rotatable lever arm mounted to the substrate and having wire holders disposed thereon for receiving the EMF of spark plug wires of a distributorless ignition system (DIS) ignition, the arm being operable in a closed position in electrical contact with the capacitive plate to conduct the DIS spark plug wire EMF to the plate, and operable in an open position for securing a standard ignition coil secondary wire between the arm and the plate allowing the standard wire EMF to be coupled to the capacitive plate, the capacitive plate presenting all such EMF signals to the electrical connector as the sensed indication of spark plug voltage signal magnitude.

The universal sensor of the present invention is capable of measuring, with a single probe, the secondary ignition voltage signals in a plurality of different type ignition systems requiring different configuration sensors. This reduces the capital expense for the engine diagnostic equipment.

These, and other objects, features and advantages of the present invention will become more apparent in light of the following detailed description of a best mode embodiment thereof, as illustrated in the accompanying Drawing.

BRIEF DESCRIPTION OF THE DRAWING

FIG. 8 is an illustration of still another application of the sensor of FIG. 1.

BEST MODE FOR CARRYING OUT THE INVENTION

Figure 2:
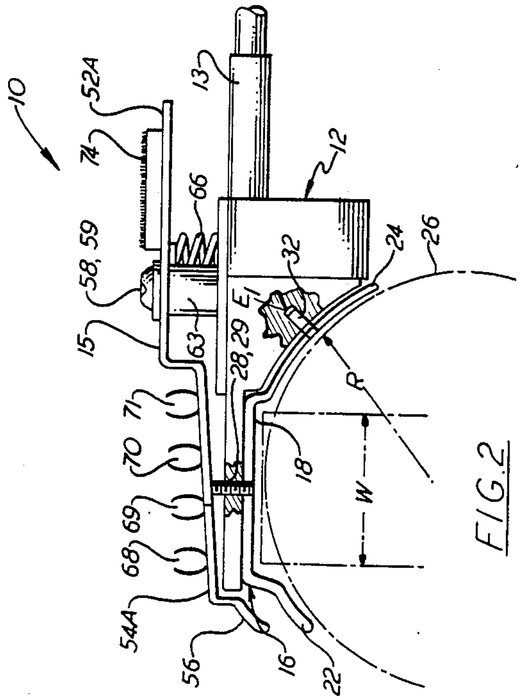
FIG. 2 is a side elevation view of the sensor of FIG. 1.
Figure 1:
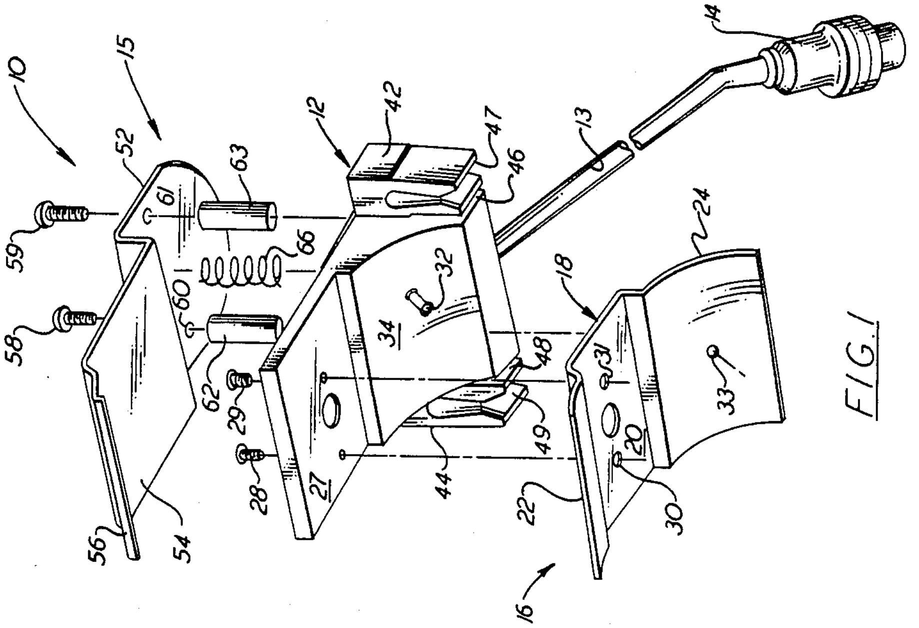
FIG. 1 is an exploded, perspective view of a universal secondary high voltage sensor according to the present invention.

FIG. 1 is an exploded, perspective illustration of a universal secondary voltage sensor 10 according to the present invention. The sensor comprises three major elements: a support substrate 12 with cable 13 and test equipment connector 14, a movable wire retaining arm 15, and a capacitive sensor plate 16. The plate is comprised of an electrically conductive material, such as aluminum. The shape of the capacitive sensor plate is an important feature of the present sensor. It includes a shaped central ridge portion 18 having a contact surface 20, and having first and second curved surfaces (front and rear curved surfaces) 22, 24 extending from the longitudinal sides of the ridge portion. FIG. 2 is a side elevation of an assembled sensor 10, and shows the curved surfaces 22, 24 as forming arc segments of a circumference of radius R; shown in phantom 26. As described hereinafter, this allows the sensor plate to fit snugly against certain integral coil configurations.

The sensor plate is connected at its ridge portion to a mounting surface 27 of substrate 12 with fasteners 28, 29, which may include rivets. The fasteners secure the ridge portion through holes 30, 31. A fastener 32 secures the rear curved surface 24 through hole 33 in a similar curved portion 34 of the substrate. The fastener 32 provides electrical connection of the sensor plate 16 to the cable 13, as shown schematically in FIG. 4.

Figure 4:
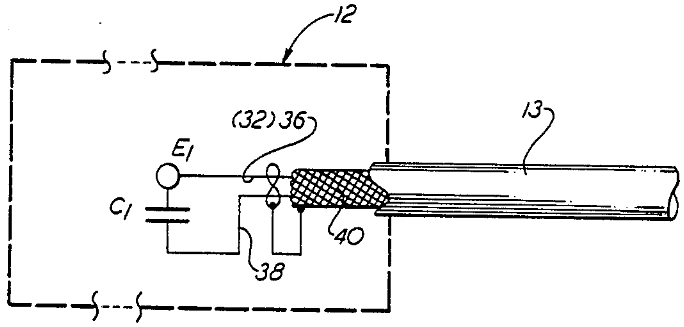
FIG. 4 is a schematic illustration of one aspect of the sensor of FIG. 1.

In FIG. 4 the contact point $E_1$ represents the end of the fastener 32 within the substrate housing. One conductor 36 of the cable 13 is connected to $E_1$ and a trim capacitor $C_1$ is electrically connected between the contact $E_1$ and a second conductor 38 of the cable. The $C_1$ capacitor is a 56,000 PF ceramic component which is used to fix the gain (amplitude) of the sensor plate signal. The capacitor acts as a low pass filter. The higher the value of $C_1$, the lower the sensed voltage amplitude.

Figure 3:
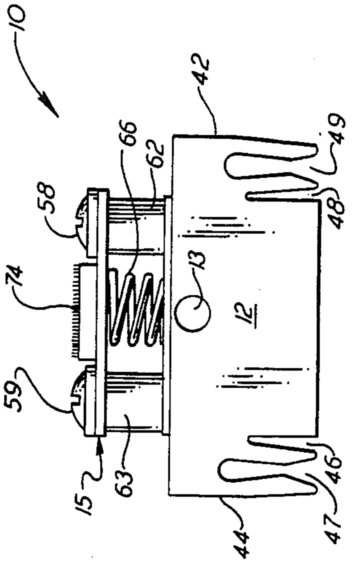
FIG. 3 is an end elevation view of the sensor of FIG. 1.

The substrate comprises a dielectric material, preferably an injection molded plastic, to provide electrical insulation of the capacitive plate 16. The substrate geometry is shaped to conform to the sensor plate 16. It includes molded clips 42, 44 on opposite outside edges of the substrate, more or less at the ends of the length of the sensor plate ridge. As described hereinafter the clips are used to hold the sensor in place to the General Motors (GM) integral coil type assembly. The clips are spring tensioned, forming channels 46, 47 and 48, 49 (as shown more clearly in a rear view of the assembled sensor in FIG. 3).

The fasteners 28, 29 securing the ridge portion of the sensor plate to the substrate, extend through the substrate so as to provide, in the assembled sensor, electrical contact between the sensor plate and the movable arm 15 when the arm is in the normal closed position. This is shown more clearly in the breakaway portion of the substrate mounting surface in FIG. 2. The movable arm 15 also comprises electrically conductive material, such as aluminum. The arm is a single piece construction which is pressed into a shape having a lever 52, a connector portion 54, and a wire retaining portion 56. The lever portion is connected with fasteners 58, 59 through holes 60, 61 and insulated spacers 62, 63 to the substrate. The fasteners may be screws or rivets. A spring 66 provides a compressive force to load the lever 52 so as to force the connector portion 54 into contact with the fasteners 28, 29.

The exposed surface 54A of the connector includes a plurality of U-shaped spring-loaded clips 68–71. The clips are thin spring steel which are adapted to receive spark plug wires. As described hereinafter with respect to FIG. 8, the clips are used in the $C^3$I/DIS distributorless ignition system. The upper surface 52A of the lever portion of the arm also includes a VELCRO® pad 74 bonded to the surface and used to secure the sensor to a distributor housing, as described in detail hereinafter with respect to FIG. 7.

Figure 5:
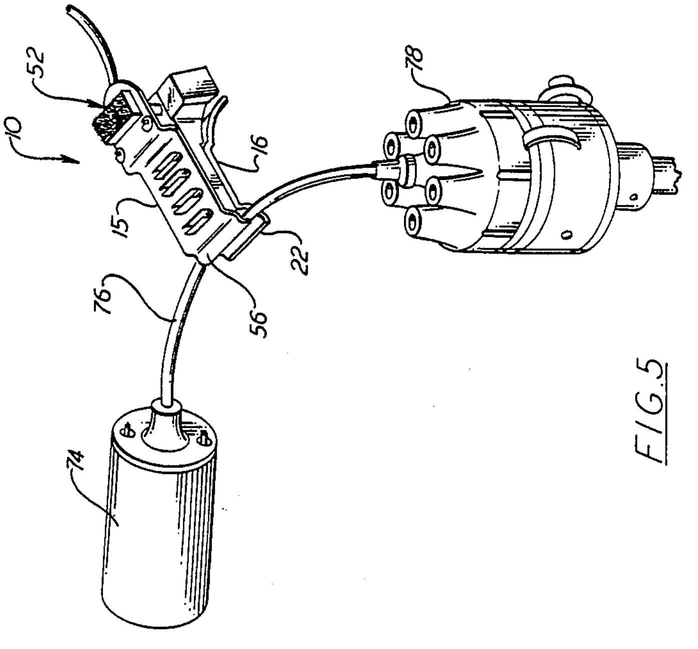
FIG. 5 is an illustration of one application of the sensor of FIG. 1.

The universal secondary voltage sensor of the present invention is capable of measuring the secondary ignition voltage of the majority of all domestic and imported motor vehicles. FIG. 5 illustrates use of the present sensor with a standard coil configuration. The engine ignition coil 75 is connected through the secondary wire 76 to the center post of the engine distributor 78. The sensor is connected to the secondary wire by pressing down on the lever which pivots the wire retaining arm 56 upward. The coil wire is inserted between the retaining arm and the first curved surface 22 of the capacitive plate 16. The lever is released with the wire securely in place. When connected to the coil wire the arm 15 is spaced from the fasteners 28, 29 (FIGS. 1, 2) so as to break the electrical contact between the arm and the plate 16. The electromagnetic field (EMF) generated by the coil current through the wire induces current flow in the capacitive sensor plate which is coupled through fastener 32 to capacitor $C_1$ and conductor 36 of the cable 13 (FIG. 4).

Figure 6:
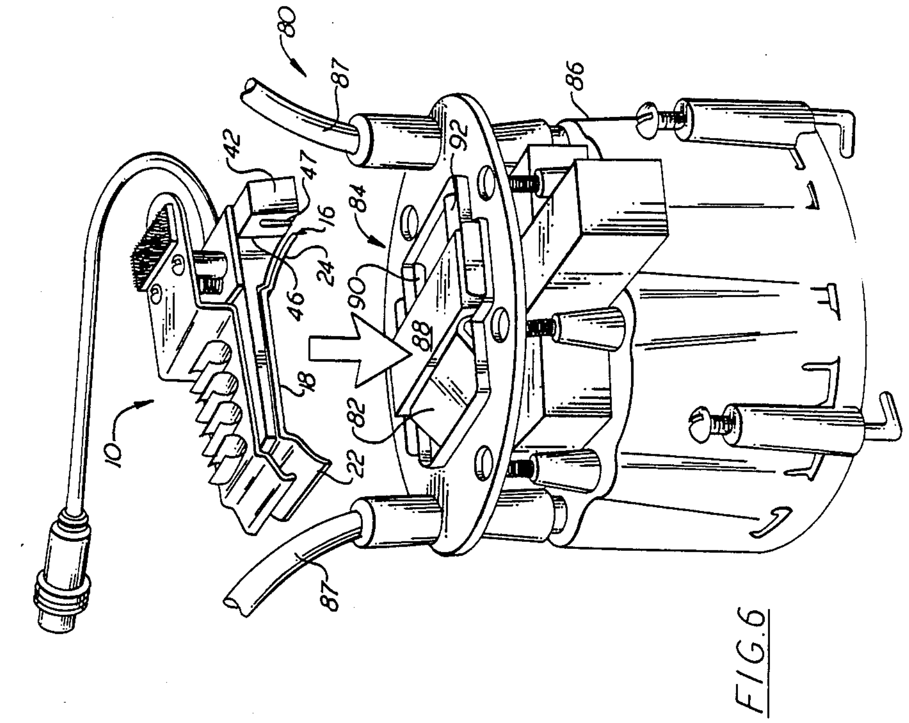
FIG. 6 is an illustration of another application of the sensor of FIG. 1.

FIG. 6 illustrates use of the sensor in measuring the coil secondary voltage in a General Motors High Energy Ignition (HEI) ignition assembly 80. This is one type of integral ignition coil assembly, the other being a Toyota system model described with respect to FIG. 7.

In the GM HEI system the ignition coil 82 is mounted at the top end 84 of the distributor assembly 86, which also receives the engine spark plug wires 87 (only two shown). The sensor fits within the central clearing on the top surface of the distributor; between the spark plug wires.

The ignition coil connects directly to the distributor rotor (also not shown) without use of a coil secondary wire. It is, therefore, necessary to measure the coil magnetic field directly. In the present sensor this is done by connecting the ridge portion of the capacitive sensor plate 16 to a molded, ridge-like portion 88 of the HEI distributor. This molded ridge covers the ignition coil and fits within the profile geometry of the sensor plate ridge to allow snug fitting of the plate to the top surface of the assembly. The curved surfaces (22, 24) of the plate fit the curved surface of the coil. Ribs 90, 92 molded into the surface of the HEI assembly engage the slots (e.g. 47, 49) of the tabs 42, 44 of the sensor substrate. This holds the sensor in place on the top of the distributor.

Figure 7:
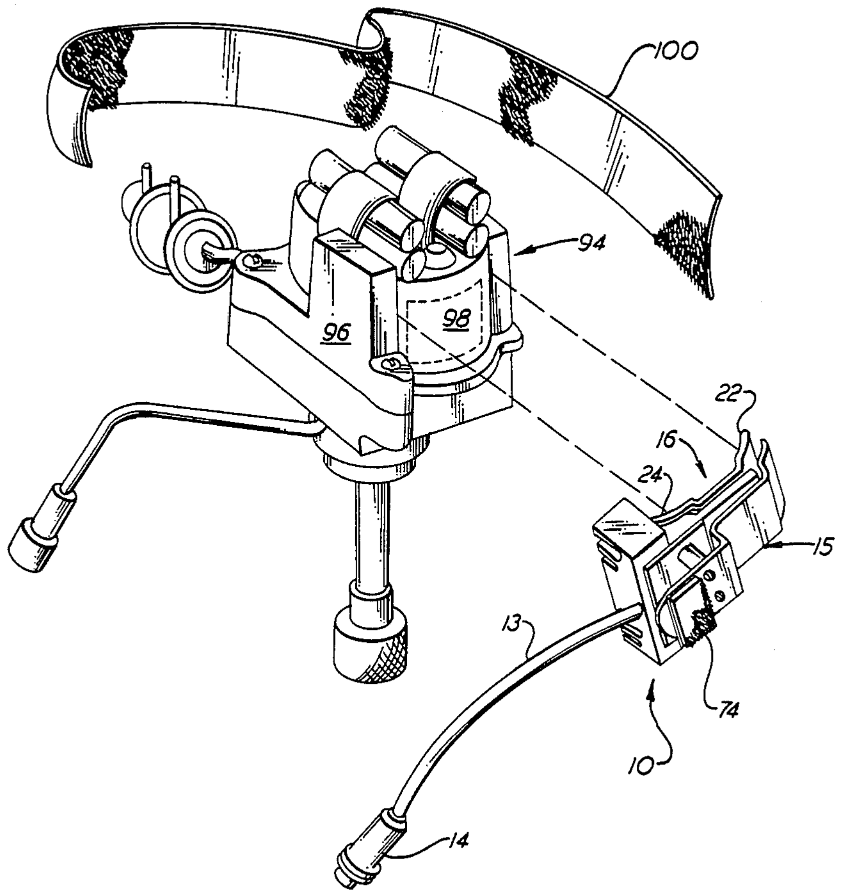
FIG. 7 is an illustration of still another application of the sensor of FIG. 1.

FIG. 7 illustrates a Toyota model integral ignition coil assembly 94. The ignition coil is located within the plastic housing 96, on the side of the housing, at the approximate side position shown by phantom outline 98. The sensor is placed against the side mounted coil with the sensor plate resting against the curve surface of the housing 96. The sensor is secured in place with a VELCRO strip 100, or similar type belt, which wraps around the housing and attaches at both ends to the VELCRO strip 74 on the sensor arm 15. The VELCRO strip, approximately 16 inches long, wraps around the distributor cap and holds the capacitive plate 16 in close proximity to the ignition coil, to allow the capacitive plate to sense the coil EMF.

FIG. 8 illustrates the use of the present sensor in a $C^3$I/DIS ignition 100. In the $C^3$I/DIS configuration there is one coil and two spark plug wires for every two cylinders. The coils 101–103 are shown in phantom outline within the DIS housing 104. The housing sits on top of an electronic module 105 which controls the ignition normal and bypass modes. The module includes an electrical connector 106 which connects the module through a cable (not shown) to the motor vehicle onboard computer; all of which is well known in the art.

In the $C^3$I/DIS ignition system there is no distributor rotor or cap; the ignition coils discharge directly through the spark plug wires 109–113 to the spark plugs. Therefore, in a six cylinder engine, a prior art type voltage sensor would have to be connected separately to each of the six wires. The present sensor allows up to four plug wires to be monitored at one time. Two sensors are required for simultaneous measurement.

The coil 101 simultaneously excites plug wires 108, 109; coil 102 excites plug wires 110, 111; and coil 103 excites plug wires 112, 113. For the six cylinder engine shown, plug wires 109, 111, and 113 are inserted in clips 69–71. With the arm 15 in the closed position it is in electrical contact with the fasteners 28, 29 (FIG. 1) and with the sensor plate 16. The successive plug wire EMFs induce current flow through the arm and fasteners, to the sensor plate. The plate provides the sensed signals to the cable 13. Once these waveforms are obtained, the sensor is moved to plug wires 108, 110, and 112.

In each measurement application, the EMF of the coil, coil secondary wire, or the spark plug wires induces a current signal in the capacitive plate. The current signal is coupled through the output line 13 to the connector 14. The host test equipment scales the current signal magnitude to an actual kilovolt (KV) level for display.

Figure 9:
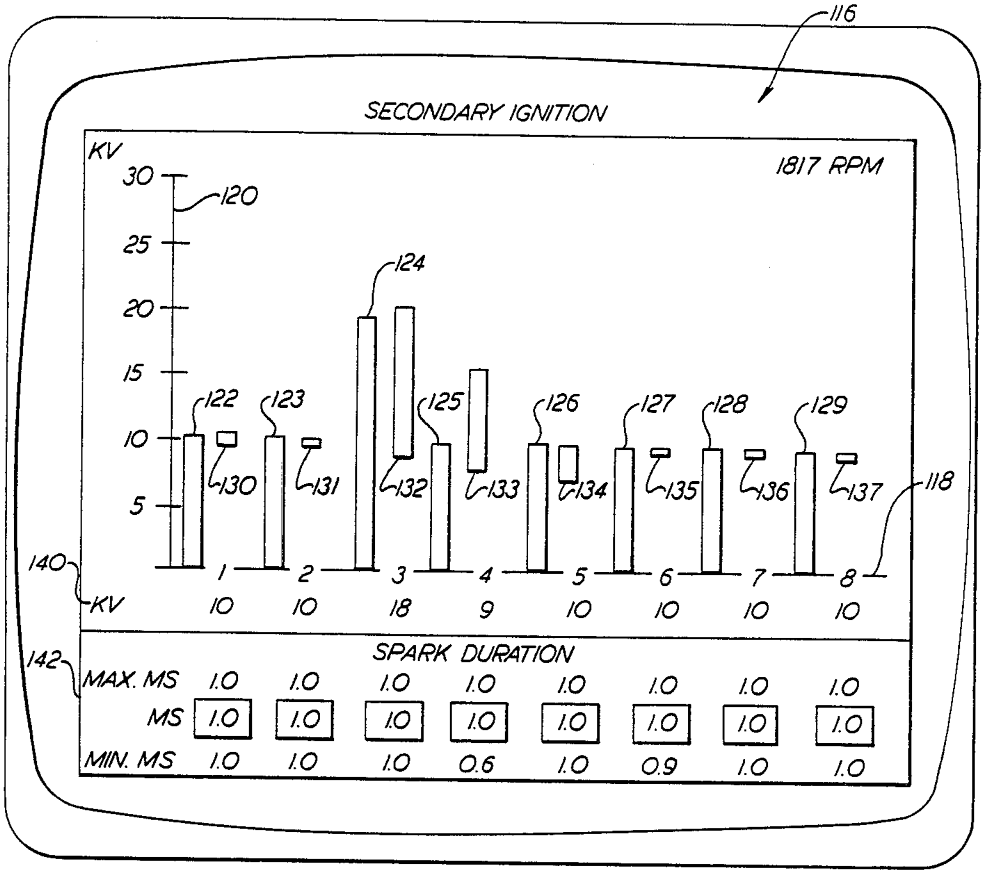
FIG. 9 is an illustration of a set of waveforms used in the description of the invention.

FIG. 9 illustrates a typical prior art display screen 116 for displaying the sensed spark plug voltages for an eight cylinder engine. The abscissa 118 lists the cylinders (1–8) and the ordinate 120 lists the plug voltages (KV). In the illustrated display the vertical bars extending from the abscissa represent the average absolute voltage values for each spark plug. The segment bars 130–137 show the deviation from the average values. The scale 140 prints the average values, and the sub-display 142 displays the spark plug voltage time duration.

The present universal sensor provides in a single device the same measurement functions performed by a plurality of prior art sensor probes. The resulting cost savings approach 70%. In addition, the use of a single probe saves time otherwise spent in locating and changing probe types.

Although the invention has been shown and described with respect to a best mode embodiment thereof, it should be understood by those skilled in the art that various other changes, omissions, and additions may be made therein, without departing from the spirit and the scope of the invention.

We claim:

1. Apparatus, for use with a plurality of different configuration internal combustion (IC) engine ignition systems, for providing a current signal indication of the sensed magnitude of the voltage signal provided to the engine spark plug wires by the ignition system coil, comprising:

a dielectric material substrate, having first and second mounting surfaces, and including electrical connector means;

a capacitive sensor plate fastened to said second mounting surface with electrical contact between said plate, said first mounting surface, and said electrical connector means, said plate having a substantially curved major surface adapted for sensing the electromagnetic field (EMF) of an integral coil ignition system to provide the current signal indication of the sensed sparkplug voltage signal magnitude to said electrical connector means; and a wire retaining arm having a plurality of spark plug wire holders at on one end and having a lever at another end thereof, said wire holders adapted for receiving the EMF of sparkplug wires of a distributorless ignition system (DIS) ignition, said arm being pivotably mounted on said first mounting surface to operate in a closed position to provide electrical contact with said sensor plate to conduct the DIS EMF current signal to said plate, and operable in an open position for securing a standard ignition coil wire between the arm and the plate to couple the coil wire EMF to the sensor plate, the sensor plate presenting all EMF signals to said connector means.

2. The apparatus of claim 1, wherein said capacitive sensor plate comprises aluminum.

3. The apparatus of claim 1, wherein said sustrate comprises plastic.

* * * * *